UNITED STATES PATENT OFFICE.

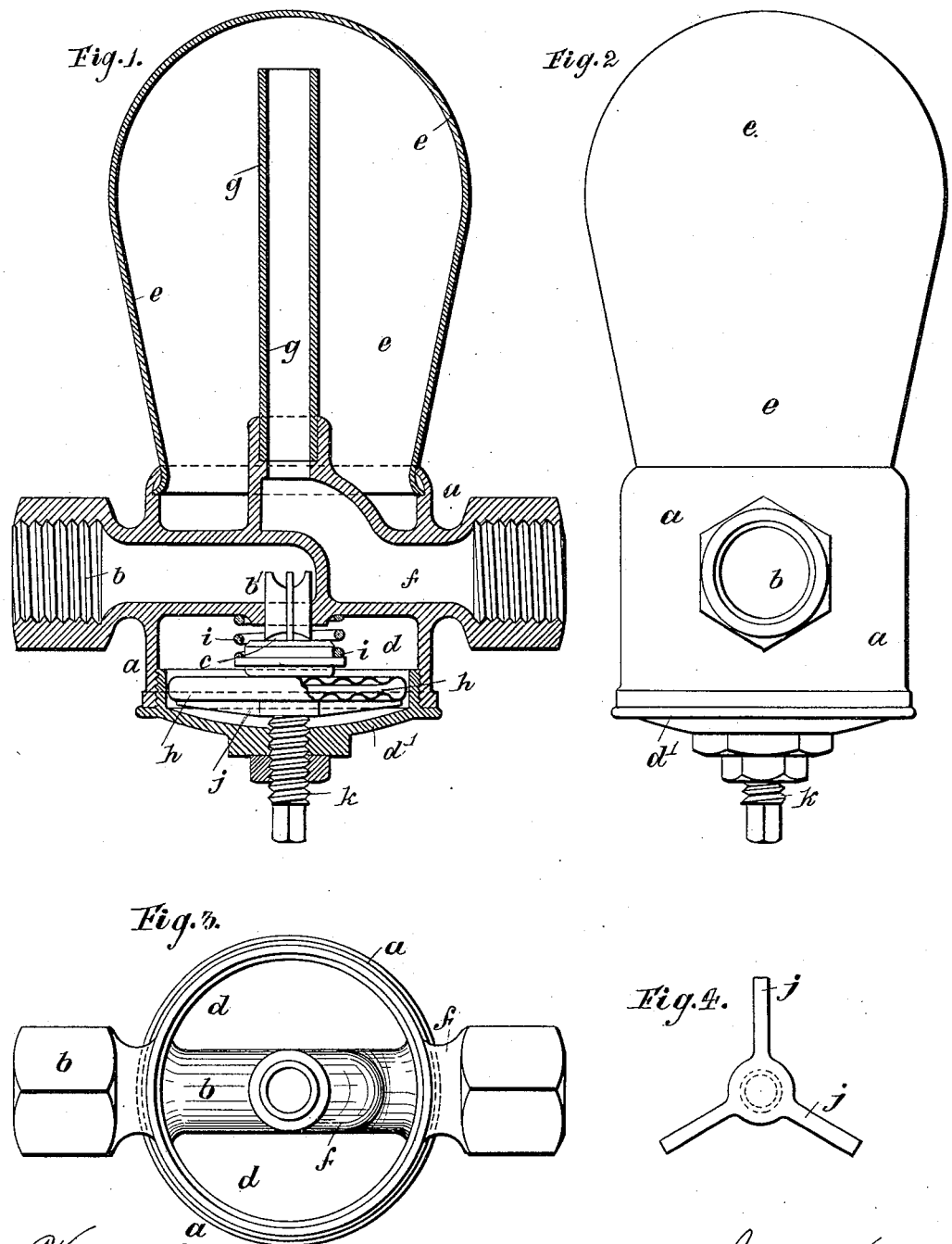

FREDERICK LAMPLOUGH, OF LONDON, ENGLAND.

AUTOMATIC RESERVOIR STEAM-TRAP.

SPECIFICATION forming part of Letters Patent No. 614,559, dated November 22, 1898.

Application filed July 16, 1898. Serial No. 686,090. (No model.)

*To all whom it may concern:*

Be it known that I, FREDERICK LAMPLOUGH, a subject of the Queen of Great Britain, residing at London, England, have invented a certain new and useful Automatic Reservoir Steam-Trap, of which the following is a full, clear, and exact description, and for which I have made an application for patent in Great Britain, bearing date June 24, 1898, No. 14,031.

The invention has for its object the production of a simple and reliable automatic reservoir steam-trap.

My invention is illustrated in the accompanying drawings, in which—

Figure 1 is a vertical section, Fig. 2 an end elevation, and Fig. 3 a plan with the condensing-dome removed, of my improved steam-trap; and Fig. 4 is a plan of part thereof separately.

For this purpose I construct the body $a$ of the trap with a steam-inlet $b$, leading through a passage $b'$ to a valve $c$, communicating with a chamber $d$ for the reception of water of condensation. This chamber $d$ communicates with the interior of a dome $e$, connected with the body $a$ of the trap and made, preferably, of thin copper to enable it to act as an air-condenser. The body $a$ of the trap is also provided with an outlet-passage $f$, communicating at its inner end with a discharge-tube $g$, rising to near the top of the condensing-dome $e$.

The condensation-water chamber in the body of the trap is provided with a detachable hermetically-sealed expansible corrugated capsule $h$, charged with a volatile fluid. The valve $c$ is pressed down onto such capsule $h$ by a spring $i$, and the capsule rests on a support $j$, acted upon by an adjusting-screw $k$, whereby it can be readily raised or lowered.

The bottom $d'$ of the condensation-water chamber $d$ is removable to enable the ready insertion and removal of a capsule $h$.

The action of the trap is as follows: Steam is admitted to the inlet $b$, and the products of condensation are discharged through the valve $c$, opening into the condensation-water chamber $d$, whence the water rises into the condensing-dome $e$, which latter, acting as an air-condenser, cools the water, and thus causes circulation of the water within the chamber $d$ and dome $e$. Thus the hottest fluid rises in the dome $e$ to the top of the discharge-tube $g$ and the coolest descends to the corrugated capsule $h$, upon which it acts with a constant tendency to contract the same, and thereby cause the valve $c$ to open slightly and practically feel for steam, a slight amount of which is necessary to keep the capsule $h$ fully expanded.

Having thus fully described my invention, what I claim, and desire to secure by Letters Patent, is—

1. In a steam-trap, the combination of a body formed with a steam-inlet, a passage from said inlet to the interior of the trap, a valve at the inner end of said passage, a chamber for condensation-water, into which such valve opens, a detachable hermetically-sealed expansible chamber containing volatile fluid supporting said valve, a condensation-dome of thin metal attached to the body of the trap and communicating with the chamber for condensation-water, a discharge-pipe rising within the condensation-dome nearly to the top thereof to secure circulation of the water within the trap, and an exit-passage in the body of the trap communicating with said discharge-pipe, substantially as herein set forth.

2. In a steam-trap, the combination of a body formed with a steam-inlet, a passage from said inlet to the interior of the trap, a valve at the inner end of said passage, a chamber for condensation-water into which such valve opens, a detachable hermetically-sealed expansible chamber containing volatile fluid supporting said valve, an adjustable support for said expansible chamber, a spring to keep the valve in contact with said expansible chamber, a removable bottom to the body of the trap to permit of access to the interior thereof, a condensation-dome of thin metal attached to the body of the trap and communicating with the chamber for condensation-water, a discharge-pipe rising within the condensation-dome nearly to the top thereof to secure circulation of the water within the trap, and an exit-passage in the body of the trap communicating with the lower end of said discharge-pipe, substantially as herein set forth.

3. In a steam-trap, the combination of a steam-inlet passage, a valve at the inner end of said inlet-passage, an expansible chamber containing expansible fluid acting upon said valve, a condensation-water chamber into which the valve opens, a condensing-dome communicating with said condensation-water chamber, and a discharge-tube communicating with the exit-passage and rising within the condensation-dome nearly to the top thereof to secure circulation of the water within the trap, substantially as herein set forth.

In testimony whereof I affix my signature in presence of two witnesses.

FREDERICK LAMPLOUGH.

Witnesses:
CLAUDE K. MILLS,
WALTER J. SKERTEN.